Feb. 6, 1940.  L. G. SMITH ET AL  2,189,255
FEEDER OR INJECTOR
Filed Feb. 20, 1939  2 Sheets-Sheet 2

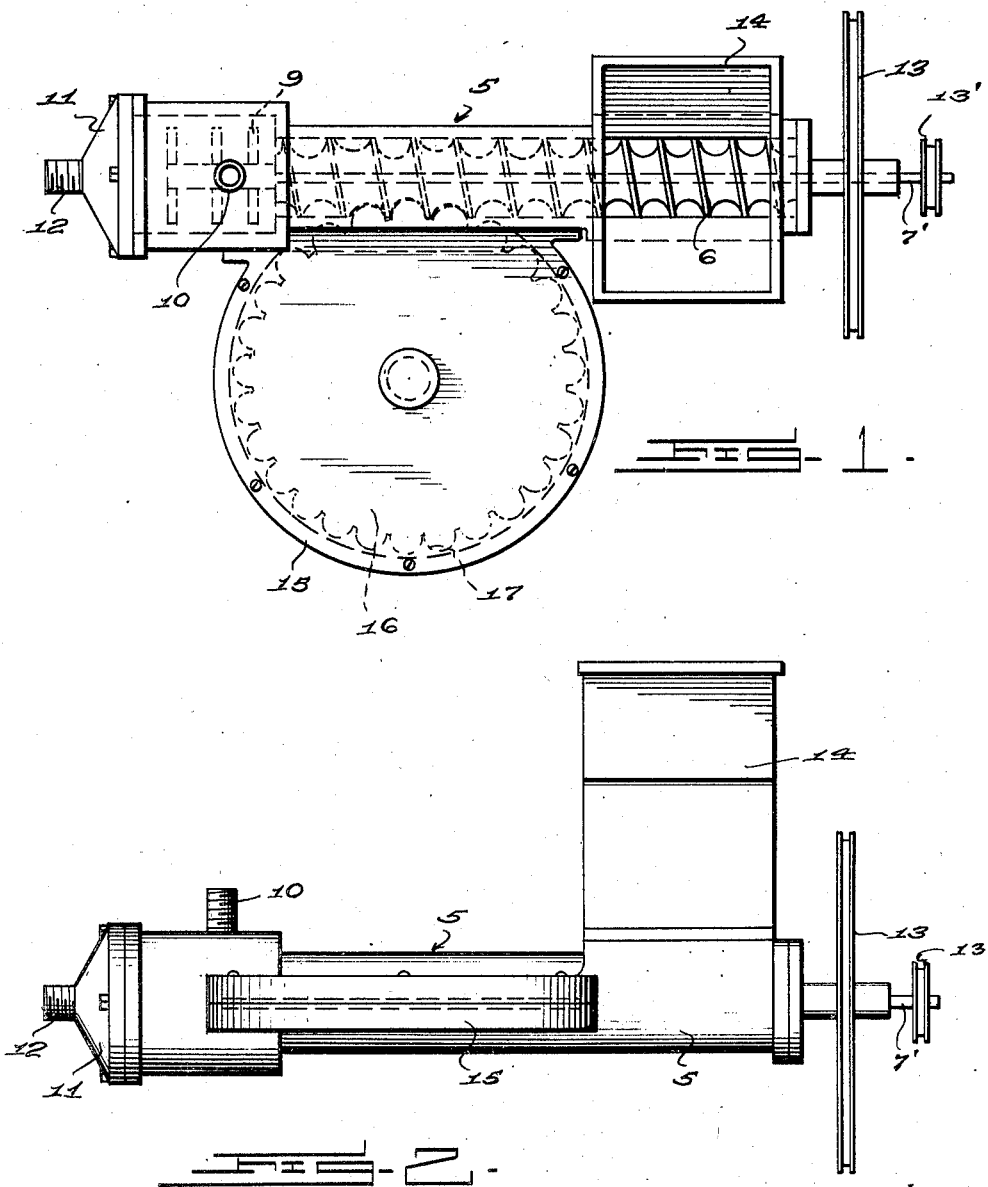

Inventors
LAWRENCE G. SMITH,
JAMES F. GREEN,

By Clarence A. O'Brien
and Hyman Berman
Attorneys

Patented Feb. 6, 1940

2,189,255

UNITED STATES PATENT OFFICE 2,189,255

FEEDER OR INJECTOR

Lawrence G. Smith and James F. Green, Oshkosh, Wis., assignors to The Green Co. Inc., Oshkosh, Wis., a corporation of Wisconsin Application February 20, 1939, Serial No. 257,537

1 Claim. (Cl. 259—10)

This invention relates to a feeder or injector especially adapted for combining fruits, nuts and other foods with frozen and non-frozen dairy products, and has for the primary object the provision of a device of this character wherein the commingling of said materials may be successfully carried out and discharged from a common outlet.

Another object of this invention is the provision of a conveyor means coacting with a mixing chamber which receives the dairy products for forcing fruits, nuts or other foods into said chamber from a source to bring about thorough mixing thereof with the dairy products and has coacting therewith an injector disc to force the food into the mixing chamber from the source also acting as a check during idleness of the conveyor means to prevent reverse flow of the materials from the mixing chamber to the source over said conveyor means.

With these and other objects in view, the invention consists in certain novel features of construction, combination and arrangement of parts to be hereinafter more fully described and claimed.

For a complete understanding of our invention, reference is to be had to the following description and accompanying drawings, in which—

Figure 1 is a top plan view illustrating a feeder or injector constructed in accordance with our invention.

Figure 2 is a side elevation illustrating the device.

Figure 3:
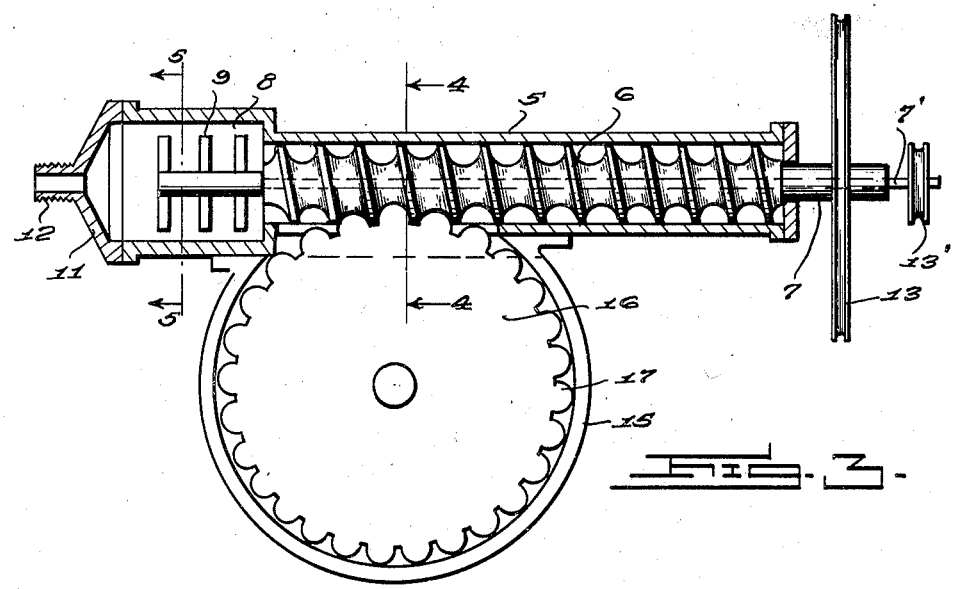
Figure 3 is a longitudinal sectional view showing the device.
Figures 4, 5:
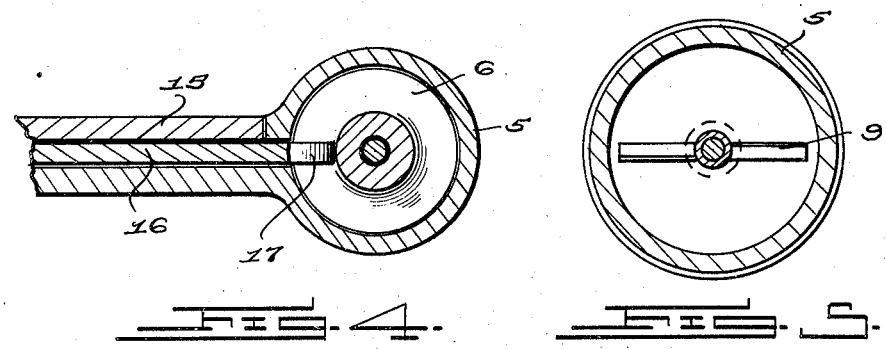
Figure 4 is a transverse sectional view taken on the line 4—4 of Figure 3.
Figure 5 is a transverse sectional line taken on the line 5—5 of Figure 3.

Referring in detail to the drawings, the numeral 5 indicates an elongated tubular casing in which is located a spiral conveyor 6 provided with a bore to receive an agitator shaft 7'. One end of the conveyor is in the form of a shaft 7 journaled in one end of the casing and the opposed end of said casing is enlarged to provide a mixing chamber 8 in which the shaft 7' extends. The shaft 7' also extends beyond the shaft 7. Agitating fingers 9 are secured on the shaft 7' for operation in the mixing chamber to mix materials therein. The chamber 8 has an inlet nipple 10 extending through the top wall thereof and also it is provided with a substantially conical shaped removable head 11 equipped with a discharge nipple 12.

Non-frozen or frozen dairy products, such as ice cream, custard and the like from a source may be admitted to the chamber 8 by way of the inlet nipple 10 and leaves said chamber by way of the outlet nipple 12.

The shaft 7 of the conveyor 6 extends exteriorly of the casing 5 and has secured thereon a grooved pulley 13 and a pulley 13' is secured to the agitator shaft 7' whereby the conveyor and the agitator may be belted to a power source (not shown).

The casing 5 remotely to the mixing chamber 8 is cutaway in its top wall and flared to form a combined mouth and seat for a vertically arranged hopper 14 in which foods, such as candy, nuts and the like may be placed to enter the casing and be taken up by the conveyor and moved thereby toward the mixing chamber 8.

The casing 5 on one side thereof adjacent the mixing chamber has a slot and overlying said slot and communicating with the interior of the casing 5 is a housing 15 in which is journaled a disc 16 having on the periphery thereof teeth or projections 17 adapted to enter the spirals of the conveyor with two or more teeth thereof always in mesh with the convolutions of the spiral conveyor. The disc 16 is caused to rotate by the rotation of the conveyor and due to the teeth thereof moving into and out of the convolutions of the conveyor with two or more teeth always in snug fit with said conveyor, the disc and its teeth act as an injector to force the material carried by the conveyor into the mixing chamber. Further, the disc and the teeth thereof act as a check to prevent the material within the mixing chamber from feeding along the conveyor in a reverse direction during a period of idleness of said conveyor.

Legs or any other suitable supporting structure, (not shown) may be provided for the device and by varying the speed of rotation of the conveyor various amounts of material from the hopper may be fed into the mixing chamber for commingling with the material fed directly therein by way of the inlet nipple.

A device of the character described and shown in the drawings is extremely simple in construction, economical to manufacture and maintain in operation and will thoroughly commingle a material with another material and may be operated with a minimum amount of manual effort and will permit a maximum amount of materials to be handled and brought together within a minimum length of time.

It is believed that the foregoing description, when taken in connection with the drawings will fully set forth the construction and advantages of this invention to those skilled in the art to which such invention relates, so that further detailed description will not be required.

Having thus described our invention, what we claim is:

In a device of the character set forth, a conveyor cylinder including means adjacent one end for admitting material thereto and provided with a slot adjacent the opposite end thereof, a mixing chamber formed on the latter-named end of the cylinder and including means for admitting material thereto other than from said cylinder and provided with a single outlet, a spiral conveyor extending the full length of the cylinder and having a bore arranged axially thereof and extending the full length of said conveyor, a shaft journaled in the bore with one end terminating in the chamber and the other end terminating outwardly of the bore and cylinder, belt pulleys secured on the shaft and the spiral conveyor outwardly of the cylinder, a plate closing one end of the cylinder and providing a journal for the conveyor, agitating fingers on the portion of said shaft located within the chamber, a casing having a slot matching the slot of said cylinder, and a toothed disc journaled in the casing and extending through the slots with teeth thereof meshing with said spiral conveyor.

LAWRENCE G. SMITH.
JAMES F. GREEN.